(12) United States Patent
Shahar

(10) Patent No.: US 12,021,767 B2
(45) Date of Patent: Jun. 25, 2024

(54) SYSTEMS AND METHODS FOR BROADBAND WIRELESS COMMUNICATION FOR MISSION CRITICAL INTERNET OF THINGS (IOT)

(71) Applicant: Ondas Networks Inc., Sunnyvale, CA (US)

(72) Inventor: Menashe Shahar, Los Altos, CA (US)

(73) Assignee: Ondas Networks Inc., Sunnyvale, CA (US)

( * ) Notice: Subject to any disclaimer, the term of this patent is extended or adjusted under 35 U.S.C. 154(b) by 250 days.

(21) Appl. No.: 17/421,666

(22) PCT Filed: Jan. 10, 2020

(86) PCT No.: PCT/US2020/013179
§ 371 (c)(1),
(2) Date: Jul. 8, 2021

(87) PCT Pub. No.: WO2020/146793
PCT Pub. Date: Jul. 16, 2020

(65) Prior Publication Data
US 2022/0103316 A1 Mar. 31, 2022

Related U.S. Application Data

(60) Provisional application No. 62/912,825, filed on Oct. 9, 2019, provisional application No. 62/790,774, filed on Jan. 10, 2019.

(51) Int. Cl.
*H04L 5/00* (2006.01)
*H04W 4/06* (2009.01)
(Continued)

(52) U.S. Cl.
CPC .......... *H04L 5/0035* (2013.01); *H04L 5/0039* (2013.01); *H04L 5/0098* (2013.01);
(Continued)

(58) Field of Classification Search
CPC ... H04L 5/0035; H04L 5/0039; H04L 5/0098; H04W 4/06; H04W 28/16; H04W 4/70; H04W 84/045
See application file for complete search history.

(56) References Cited

U.S. PATENT DOCUMENTS 6,795,689 B1 9/2004 Ogren et al.
8,526,390 B2 9/2013 Kim et al.
(Continued)

FOREIGN PATENT DOCUMENTS

| JP | 2001-028777 | 1/2001 |
|---|---|---|
| RU | 2454040 | 6/2012 |
| WO | WO 2010/058483 | 5/2010 |

OTHER PUBLICATIONS

India Office Action for Appl. No. 202147033413 dated Mar. 24, 2022.
(Continued)

*Primary Examiner* — Abdullahi Ahmed
(74) *Attorney, Agent, or Firm* — PEARL COHEN ZEDEK LATZER BARATZ LLP

(57) ABSTRACT

A system and method for PtMP wireless communication is provided. The PtMP wireless communication system can include a plurality of sectors each including a base station and a remote station(s). A total bandwidth the system can be determined based on a frequency range of a continuous band allocated to the system, or one or more PLMR channels when the system communicates over a Private Land Mobile Radio (PLMR) band having one or more channels. The total bandwidth can be portioned into subchannel(s), each having fixed subchannel bandwidth. Each sector can be assigned a subset of the plurality of subchannels. A subchannel bit map can be created and populated for the plurality of subchannels, specifying whether availability of each subchannel for the particular sector, and the base stations of each sector can
(Continued)

communicate over the subchannels allocated to the at least one sector according to the respective populated subchannel bit map.

17 Claims, 8 Drawing Sheets

(51) Int. Cl.
*H04W 28/16* (2009.01)
*H04W 4/70* (2018.01)
*H04W 84/04* (2009.01)

(52) U.S. Cl.
CPC ............. *H04W 4/06* (2013.01); *H04W 28/16* (2013.01); *H04W 4/70* (2018.02); *H04W 84/045* (2013.01)

(56) References Cited

U.S. PATENT DOCUMENTS

| | | | |
|---|---|---|---|
| 8,619,804 | B2 | 12/2013 | Shahar et al. |
| 10,547,409 | B2* | 1/2020 | Kato .................. H04L 5/0037 |
| 2006/0002336 | A1 | 1/2006 | Stanwood et al. |
| 2010/0091730 | A1* | 4/2010 | Jang ................... H04W 72/569 |
| | | | 370/329 |
| 2010/0265851 | A1 | 10/2010 | Shahar |
| 2010/0303033 | A1 | 12/2010 | Shahar et al. |
| 2011/0044231 | A1* | 2/2011 | Shahar .................. H04L 5/0037 |
| | | | 370/312 |
| 2011/0211568 | A1 | 9/2011 | Suga |
| 2017/0026190 | A1 | 1/2017 | Tzannes |
| 2017/0034826 | A1 | 2/2017 | Shahar |
| 2017/0079059 | A1 | 3/2017 | Li et al. |
| 2018/0097596 | A1 | 4/2018 | Palanivelu et al. |
| 2019/0222376 | A1* | 7/2019 | Wu ....................... H04L 5/0053 |
| 2021/0281454 | A1* | 9/2021 | Yang .................... H04L 5/0048 |
| 2023/0283420 | A1* | 9/2023 | Shahar ................. H04L 5/0007 |
| | | | 370/329 |

OTHER PUBLICATIONS

Russia Office Action for Appl. No. 2021121458 dated Mar. 22, 2022.

Japanese Office Action for Pat. Appl. No. 2021-540478 dated Oct. 4, 2022.

Office Action for Japanese Patent Application No. 2021-540478 dated Apr. 25, 2023.

European Search Report for Pat. Appl. No. 20737948.6 dated Sep. 5, 2022.

* cited by examiner

SYSTEMS AND METHODS FOR BROADBAND WIRELESS COMMUNICATION FOR MISSION CRITICAL INTERNET OF THINGS (IOT)

CROSS-REFERENCE TO RELATED APPLICATIONS

This application is a National Phase Application of PCT International Application No. PCT/US2020/013179, International Filing Date Jan. 10, 2020, claiming the benefit of U.S. Patent Applications Nos. 62/790,774, filed Jan. 10, 2019, and 62/912,825, filed Oct. 9, 2019, which are all hereby incorporated by references.

FIELD OF THE INVENTION

The invention relates generally to Point to Multipoint (PtMP) wireless communications systems and Mission Critical IOT. In particular, the invention relates to communication of data over adjacent or non-adjacent frequency bands that are typically used for transmission of Push to Talk (PTT) voice and/or low speed data.

BACKGROUND

Currently, wireless communications systems are employed to transmit voice and/or data between participants. As is known in the art, in order to communicate voice and/or data wirelessly, electromagnetic signals are sent and received using a particular frequency.

Some wireless communications systems are deployed to service particular geographical regions and/or particular organizations. In some scenarios, governments assign particular frequency ranges to be used only by particular organizations and/or entities such that a particular organization's network can be limited to communicate within an assigned frequency band. Many mission critical industries (e.g., railroads, electrical utilities, oil, and/or gas) can have private telecommunication systems that operate over assigned frequency as can be assigned by regulatory organizations (e.g., United States the Federal Communications Commission (FCC)). For example, PtMP wireless communications systems can operate over a PLMR band having one or more PLMR channels that are assigned.

In some instances, the regulatory organization allocates bands per geographical area per organization where a PLMR band can consist of a single PLMR channel or multiple PLMR channels. For example, in a given geographical region the FCC may allocate a 1 megahertz (MHz) wide PLMR band consisting of 80×12.5 kilohertz (KHz) PLMR channels. The 80 distinct PLMR channels can be assigned to multiple organizations. The PLMR channels assigned to one organization are a subset of 80 PLMR channels and are typically not adjacent to each other. When a wireless communication system communicates over a single PLMR channel, the throughput of the system can be limited by the bandwidth of this channel. For example, for a 12.5 KHz wide PLMR channel and with a user frequency utilization of 3 bits per second per hertz (Hz) the throughput can be limited to 37.5 kb/s.

Therefore, it can be desirable to communicate data over combined adjacent/non-adjacent channels to, for example, increase the throughput. For example, as in the previous example, if 10 adjacent or non-adjacent PLMR channels are combined, the throughput will be 375 kb/s.

SUMMARY OF THE INVENTION

Advantages of the invention can include the ability to communicate high speed data over combined adjacent and/or non-adjacent channel PLMR channels that are individually not wide enough to support communication speed needs of certain applications. Advantages of the invention can include enabling a new data communication usage of low voice utilization PLMR channels and migration the PLMR channels to new data communication systems without re-arrange the PLMR channels to make the band continuous.

Advantages of the invention can also include implementation of low cost and/or low power consumption remotes over both PLMR bands and continuous bands.

In one aspect, the invention involves a method for communication over a Point to Multipoint (PtMP) wireless communication system having a plurality of sectors, where each sector includes at least one base station and a plurality of remote stations. The method involves determining, by a processor, a total bandwidth for the PtMP wireless communication system, where the total bandwidth is a) a frequency range of a continuous band allocated to the PtMP wireless communication system, or b) based on one or more PLMR channels when the PtMP wireless communication system communicates over a Private Land Mobile Radio (PLMR) band having one or more channels. The method also involves partitioning, by the processor, the total bandwidth into a plurality of subchannels, wherein each subchannel has a fixed subchannel bandwidth. The method also involves assigning, by the processor, each sector in the PtMP wireless system a subset of the plurality of subchannels. The method also involves creating, by the processor, a subchannel bit map for the plurality of subchannels. The method also involves or each sector, by the processor, creating a populated subchannel bit map, wherein the populated subchannel bit map specifies an availability indicator which indicates whether each subchannel is available or not available for the particular sector. The method also involves communicating by the base station of at least one sector of the plurality of sectors to at least one of the plurality of remote stations over the subchannels allocated to the at least one sector according to the respective populated subchannel bit map.

In some embodiments, determining the total bandwidth based on one or more PLMR channels further comprises setting a start value for the bandwidth equal to a lowest edge of the PMLR channel having the lowest frequency among the PLMR channels in the PLMR band and setting an end value equal to the highest edge of the PMLR channel having the highest frequency among the PLMR channels in the PLMR band.

In some embodiments, the fixed subchannel bandwidth is set such that the plurality of subchannels is an integer number of subchannels within the total bandwidth. In some embodiments, where the PtMP wireless communication system operates over a PLMR band having one or more PLMR channels, either a) the fixed subchannel bandwidth is equal to a bandwidth of the one or more PLMR channels or b) the fixed subchannel bandwidth is equal to a portion of the bandwidth of the one or more PLMR channels and is set such that the plurality of subchannels is an integer number of subchannels within the bandwidth of the one or more PLMR channels.

In some embodiments, the method further involves modifying the populated subchannel bit maps for one or more sector of the plurality of sectors during operation. In some embodiments, if the availability indicator indicates a particular subchannel is available, then whether the particular subchannel is also used for voice communication is determined.

In some embodiments, the subchannel bit map for a first sector for a particular subchannel has an availability indicator that is different than the availability indicator for the same particular subchannel in the subchannel bit map for a second sector.

In some embodiments, the method also involves creating one or more subchannel groups that is a subset of the one or more plurality of channels, wherein the one or more subchannel groups include subchannels in the subset of the one or more plurality of channel that are adjacent in frequency.

In some embodiments, for each sector, each of the plurality of remote stations operates over a single subchannel or a subchannel group, wherein operating over the subchannel group comprises using one channel of the subchannel group for transmission of messages between the base station and the particular remote station that provide communication information, and the remaining channels in the subchannel group are used for communicating the data.

In some embodiments, the one or more PMLR channels are 5 KHz, 6.25 KHz, 7.5 KHz, 12.5 KHz, 15 KHz, 25 KHz, or 50 KHz. In some embodiments, a waveform between the base station and the plurality of remote stations is air interface protocol. In some embodiments, a waveform transmitted by the base station to the plurality of remote stations is OFDM with 512 subcarriers.

In some embodiments, a number of the plurality of subchannels is 512, and there is one subcarrier per subchannel. In some embodiments, all subchannels are orthogonal to each other. In some embodiments, the method involves multiplexing a periodic synchronization message, a channel frequency response exploration message, a subchannel management message, and a data communication message on each subchannel.

In some embodiments, a waveform transmitted by the plurality of remote stations to the base station is OFDMA or Single Carrier FDMA.

In another aspect, the invention involves a Point to Multipoint (PtMP) wireless communication system having a plurality of sectors, where each sector includes at least one base station and a plurality of remote stations. The system includes a processor configured to determine a total bandwidth for the PtMP wireless communication system, where the total bandwidth is a) a frequency range of a continuous band allocated to the PtMP wireless communication system, or b) based on one or more PLMR channels when the PtMP wireless communication system communicates over a Private Land Mobile Radio (PLMR) band having one or more channels. The processor is also configured to partition the total bandwidth into a plurality of subchannels, wherein each subchannel has a fixed subchannel bandwidth. The processor is also configured to assign each sector in the PtMP wireless system a subset of the plurality of subchannels. The processor is also configured create a subchannel bit map for the plurality of subchannels. The processor is also configured for each sector, create a populated subchannel bit map, wherein the populated subchannel bit map specifies an availability indicator which indicates whether each subchannel is available or not available for the particular sector. The processor is also configured communicate by the base station of at least one sector of the plurality of sectors to at least one of the plurality of remote stations over the subchannels allocated to the at least one sector according to the respective populated subchannel bit map.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
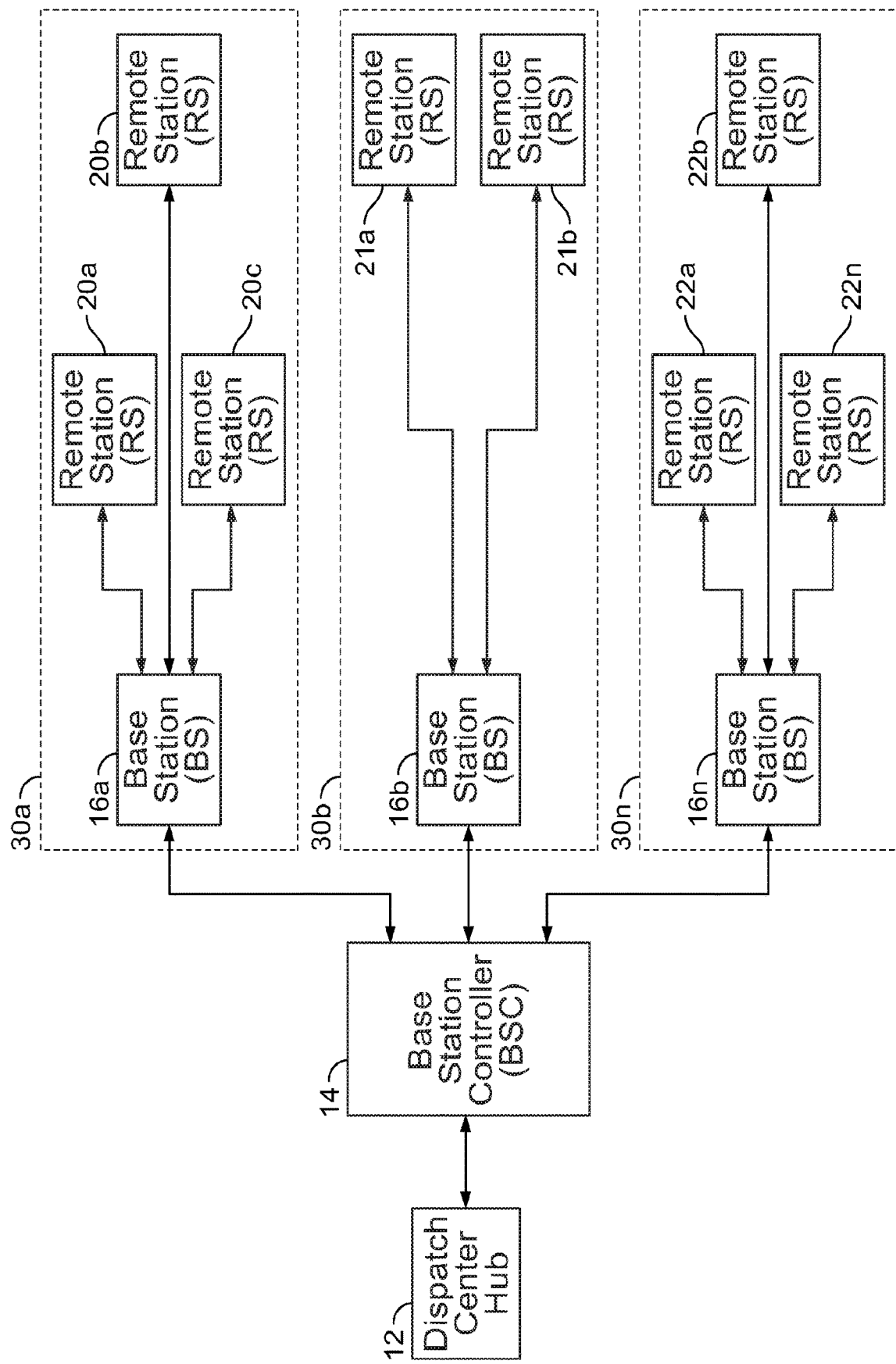
FIG. 1 is an example of a PtMP wireless communication system, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/ or circuits have not been described in detail so as not to obscure the invention.

In general, the invention involves a PtMP wireless communication system communicating over a continuous band or a PLMR band, where the PLMR band can consist of adjacent or non-adjacent PLMR channels. The PtMP wireless communication system can include a plurality of sectors where each sector has a base station and plurality of remote stations.

For a PtMP wireless communication system operating over a continuous band, a bandwidth (e.g., total bandwidth) for the PtMP wireless communication system can be equivalent to the bandwidth of the continuous band.

For a PtMP wireless communication system operating over a PLMR band, the total bandwidth for the PtMP wireless communication system can occupy a frequency range between a low edge of the lowest frequency PLMR channel in the PLMR band and a high edge of the highest frequency PLMR channel in the PLMR band.

The total bandwidth for the PtMP wireless communication system can be partitioned into subchannels of a fixed subchannel bandwidth.

For a PtMP wireless communication system operating over a continuous band, e.g., a 1 MHz band, the fixed subchannel bandwidth can be any value that produces an integer number of subchannels within the total bandwidth. The total bandwidth can be divided into a large number of narrow subchannels. While the base station of the PtMP wireless communication system may communicate over the entire continuous band with many remotes at the same time, remotes serving low throughput applications may communicate over a few or even a single subchannel. Dividing the continuous band into subchannels can enable maintaining remote station to base station communication coverage with low transmit power which can reduce the cost of the remote station and/or its power consumption.

For a PtMP wireless communication system operating over a PLMR band, the fixed subchannel bandwidth can be equal to the bandwidth of a PLMR channel. The bandwidth of the subchannel may be equal to a portion of the bandwidth of the PLMR channel, in which case the fixed subchannel bandwidth can be any value that produces an integer number of subchannels to fit the bandwidth of one PLMR channel. The frequency boundaries of the subchannels can be aligned with the frequency boundaries of the PLMR channels.

A subchannel bit map can be constructed such that it spans the frequency range of the entire band. and indicates the availability of each of the subchannels for communication. In this manner, the subchannel bit map can define the availability over the frequency range of the total bandwidth of the PtMP wireless communication system. The subchannel bit map can be populated for each sector in the PtMP wireless system, and can define availability of all of the subchannels for each sector.

For a PtMP wireless communication system operating over a PLMR band, the subchannel bit map can be configured at each sector such that the subchannels that correspond in frequency to unavailable PLMR channels are turned off and the remainder of the subchannels are turned on, and can be further evaluated for availability based on other factors as described below (e.g., depending on frequency reuse considerations, e.g., whether they are used in other sectors and there may be self-interference between the sectors)

For a PtMP wireless communication system operating over a PLMR band, the subchannel bit map can be configured at each sector such that a) subchannels corresponding to PLMR channels not available to the system are turned off and b) subchannels available to the system may be turned on or off, depending on frequency reuse considerations, e.g., whether they are used in other sectors and there may be self-interference between the sectors.

FIG. 1 is an example of a PtMP wireless communication system 100, according to some embodiments of the invention. The PtMP wireless communication system 100 includes a dispatch center hub 12, a base station controller 14, and a plurality of sectors 30a, 30b, . . . 30n, generally sectors 30.

The dispatch center hub 12 can communicate with the base station controller 14. In some embodiments, the base station controller 14 is not present, and the dispatch center hub 12 communicates directly with each of the sectors 30.

Each of the plurality of sectors has a base station and a plurality of remote stations. As shown in FIG. 1, sector 30a includes base station 16a, and three remote stations 20a, 20b, and 20b. Sector 30b includes base station 16b, and two remote stations 21a and 21b. Sector 30n includes base station 16n and remote stations 22a, 22b, . . . , 22n. In various embodiments, the PtMP wireless communication system 100 can have any number of sectors, and each sector can have any number of base stations and/or remote stations.

In some embodiments, the PtMP wireless communication system 100 has a plurality of cells (not shown). Each cell in the plurality of cells can include an area served by one tower site that is located at a center of the cell. The cell can have one sector or be partitioned into multiple sectors. For example, the PtMP wireless communication system can have a cell with three sectors, where each sector covers 120° of the cell. A sector can be served by a single sector base station or a multisector base station can be used to support multiple sectors in the cell.

The PtMP wireless communication system 100 can be a private or public wireless communication system. The PtMP wireless communication system 100 can have one or more PLMR channels assigned by the FCC or by any national spectrum regulation agency outside of the US.

As described in further detail below with respect to FIG. 2, a plurality of subchannels can be determined for the PtMP wireless communication system 100. Each base station 16a, 16b, . . . , 16n can transmit and receive signals in all or a subset of the subchannels available to the system. Each remote station in each of the sectors 30 can transmit and receive in a subset of the subchannels available to the sector (e.g., a subset of the subchannel available to the sector may be a single subchannel or a plurality of the subchannels).

In some embodiments, limiting the remote station to transmit over a subset of the subchannels available to the sector can help reduce cost and/or power consumption of the remote station. For example, assume a base station operates over 80 subchannels with a fixed subchannel bandwidth of 12.5 KHz, resulting in a bandwidth for the sector served by the base station of 1 MHz. In this example, assume a remote station communicates with the base station over only a single subchannel. In this example, the base station and remote station coverage is the same with a ratio of 10 log 80=19 dB difference between the transmit power level of the base station and this remote, e.g., if the base station transmits at 45 dBm, the remote station that transmits only over a single subchannel can transmit at a only 26 dBm. In this manner, the cost and power consumption of the remote station can be reduced. In this embodiment, where the remote station communicates over a single subchannel and not over multiple non-adjacent channels, a simple bandpass filter instead of a complex filter can be used which can further reduces complexity and cost.

The PtMP wireless communication system can employ Time Division Duplex or Half Duplex Frequency Division Duplexing (FDD) or FDD. If the PtMP wireless communication system employs TDD, it can support an extreme asymmetrical DL:UL ratio in the range of 1:10 to 10:1 which can help improve frequency utilization in asymmetrical and reverse asymmetrical application.

The base station can employ Orthogonal Frequency Division Multiplexing (OFDM) in the downlink direction (from the base station to the remote stations) The number of subcarriers per subchannel may be one or multiple. As an example, the system may employ 512 subcarriers in the downlink direction which can be used to partition into 512 subchannels, each employing a single subcarrier.

The PtMP remote station can employ either single carrier or Single Carrier OFDMA (SC-FDMA) to communicate with the base station in the uplink direction. A remote station can employ single carrier if it communicates with the base station over a single subchannel and SC-FDMA if it communicates with the base station over multiple adjacent or non-adjacent subchannels.

In some embodiments, the PLMR channel bandwidths can be 5 KHz, 6.25 KHz, 7.5 KHz, 12.5 KHz, 15 KHz, 25 KHz or 50 KHz.

Each base station 16a, 16b, . . . 16n, can transmit and receive electromagnetic signals (e.g., radio frequency (RF)) signals via its own local antenna. Each remote station 20a, 20b, 20c, 21a, 21b, 22a, 22b, . . . 22n, can transit and receive RF signals via its own local antenna.

Figure 2:
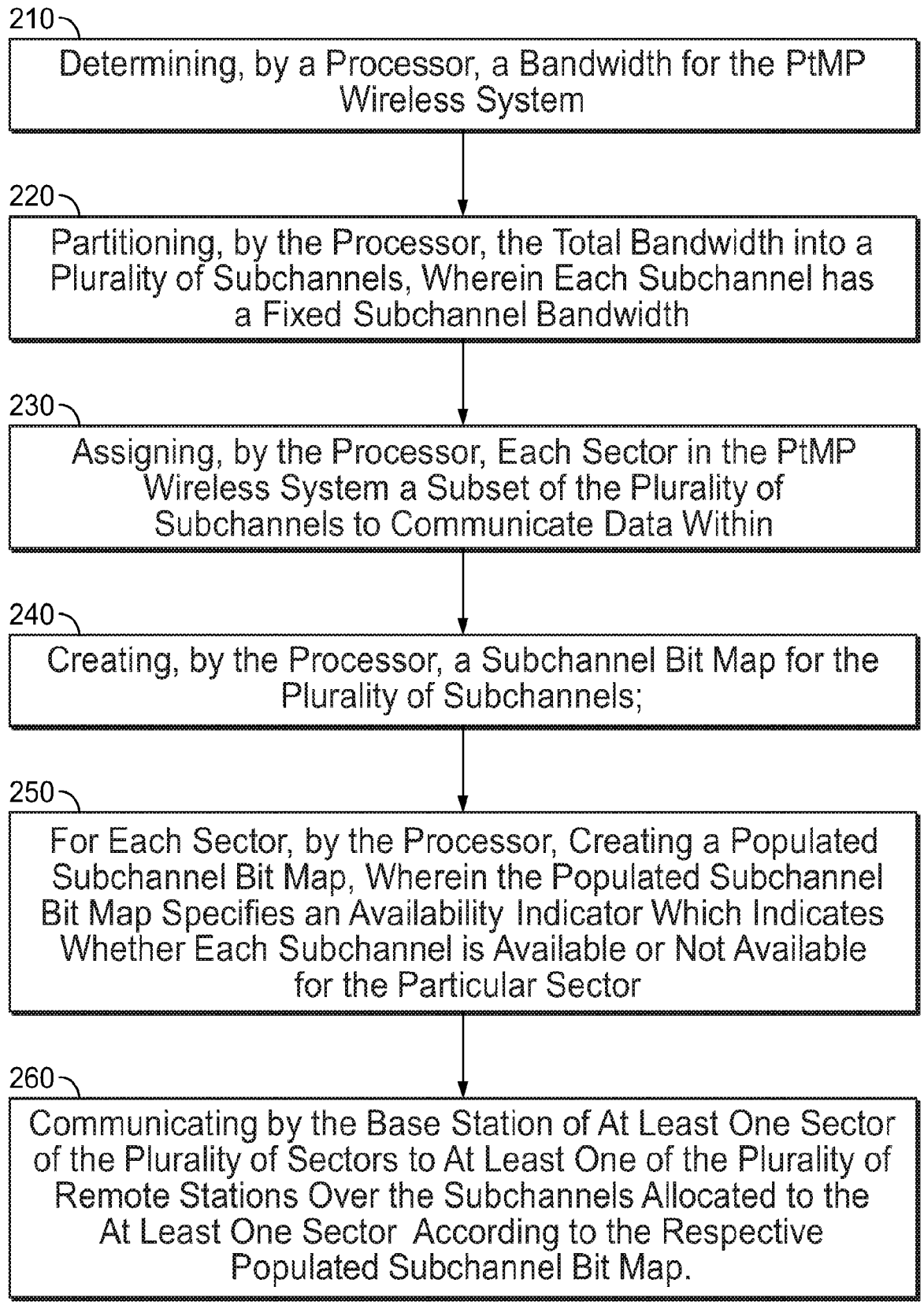
FIG. 2 is a flow chart for a method for wireless communication over a PLMR band having a plurality of sectors, according to some embodiments of the invention.

FIG. 2 is a flow chart for a method for wireless communication via a PtMP wireless communication system (e.g., PtMP wireless communication system 100 as described above in FIG. 1), according to some embodiments of the invention. The PtMP wireless communication system can include a plurality of cells and/or a plurality of sectors.

The PtMP wireless communication system can be allocated a frequency band by the applicable regulatory organization. The allocated frequency band may be a continuous band in which an entire frequency range is allocated to the system or a PLMR band in which only one or more PLMR channels within the frequency range of the band are allocated to the system. In either case, the frequencies available for use by the system can be partitioned between the sectors to meet the self-interference goals.

The method involves determining, by a processor, a bandwidth (e.g., total bandwidth) for the PtMP wireless communication system (Step 210).

For a PtMP wireless communication system operating over a continuous band, determining the total bandwidth can involve setting the total bandwidth to be equivalent to a bandwidth of the continuous band.

For a PtMP wireless communication system operating over a PLMR band, determining the total bandwidth based on one or more PLMR channels can involve setting a start value for the total bandwidth equal to a lowest edge of the PMLR channel having the lowest frequency among the PLMR channels in the PLMR band and setting an end value equal to the highest edge of the PMLR channel having the highest frequency among the PLMR channels in the PLMR band.

The method also involves partitioning, by the processor, the total bandwidth of the band into a plurality of subchannels, wherein each subchannel has a fixed subchannel bandwidth (Step 220). The fixed subchannel bandwidth can be set such that the plurality of subchannels is an integer number of subchannels within the total bandwidth. For example, assume the total bandwidth is 1.35 MHz. The fixed subchannel bandwidth can be set to 15 KHz to produce 90 channels, or 12.5 KHz to produce 108 channels In some embodiments, where the PtMP wireless system operates over PLMR band, the fixed subchannel bandwidth is equal to the PLMR channel bandwidth. In some embodiments, where the PtMP wireless system operates over PLMR band, the fixed subchannel bandwidth is equal to a portion of the bandwidth of the one or more PLMR channels and is set such that the plurality of subchannels is an integer number of subchannels within the bandwidth of the one or more PLMR channels The method also involves, assigning each sector (e.g., sectors 30 as described above in FIG. 1) in the PtMP wireless system a subset of the plurality of subchannels (Step 230). In various embodiments, the subset of the plurality of subchannels are subchannels that are adjacent in frequency, not adjacent in frequency, or some combination thereof.

In some embodiments, single subchannels, adjacent subchannels in the plurality of subchannels or adjacent subchannels in a subset of the plurality of subchannels are grouped into respective subchannel groups. In some embodiments, the first subchannel (or single channel) in a subchannel group carries synchronizations signals, bandwidth allocation messages and/or other management messages that can establish and/or maintain communication between the base station and remote stations operating in the respective subchannel group. The other subchannels in the group can be used for data communication alone. As such, the more subchannels in a subchannel group, the lower the percentage overhead of the synchronization, bandwidth allocation and/or management messages. In the case of a single sub-channel, the data can be multiplexed with the other messages/signals.

Figure 3A:
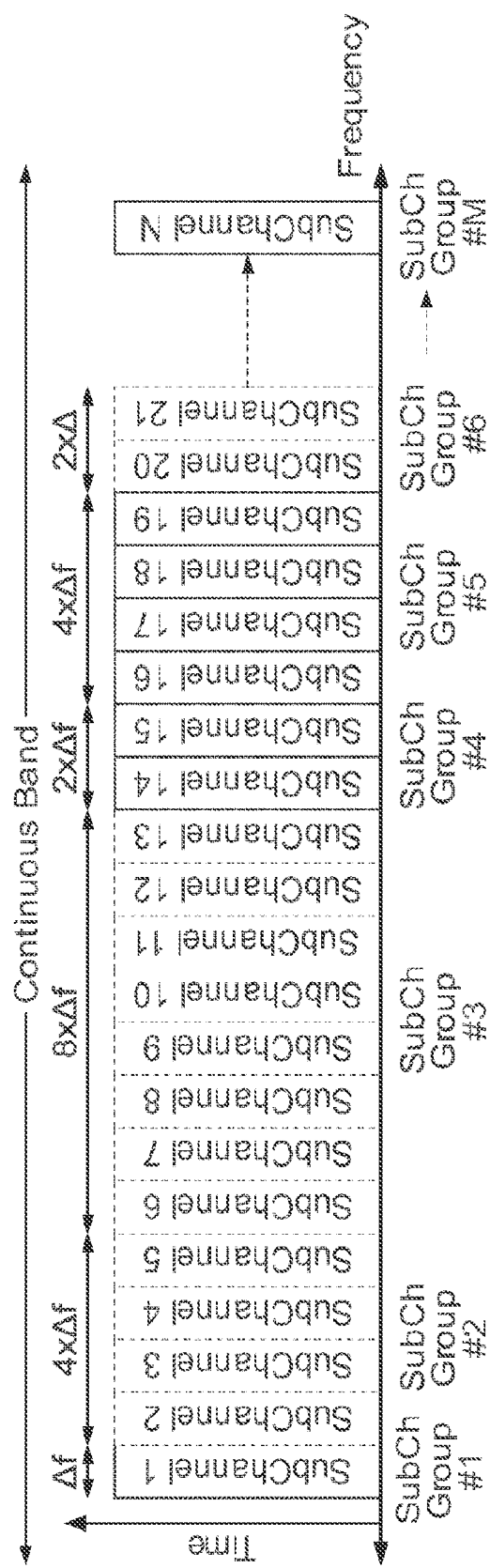
FIGS. 3A and 3B, are examples of subchannels in a continuous band and non-continuous band configuration, according to some embodiments of the invention.
Figure 3B:
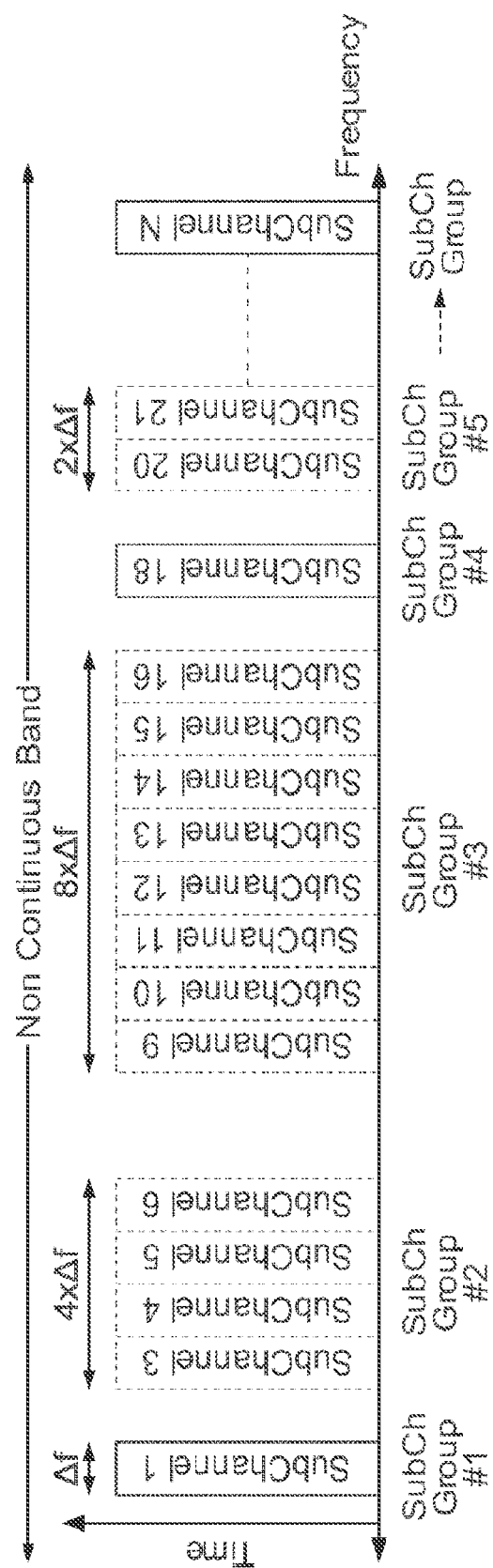

A subchannel group can be self-sufficient in the sense that remote stations can communicate with the base station over a single subchannel group (e.g., transmitting any and/or all messages necessary for communication between the base station and the remote station, while also communicating the data). Turning to FIGS. 3A and 3B, are examples of subchannels, subchannels 1 through N, in a continuous band and non-continuous band configuration.

As shown in FIG. 3A, for the continuous band, the subchannels are adjacent and grouped such that from subchannel 1 to 21 there are 6 subchannel groups. As shown in FIG. 3B, for the non-continuous band some of the subchannels are adjacent, some of the subchannels stand alone, and some of the subchannels are not available to the PtMP wireless communication network.

Turning back to Step 230 of FIG. 2, for a PtMP wireless communication system operating over a continuous band, each subset of the plurality of subchannels assigned can be assigned to a respective sector. For example, assume the PtMP wireless communication system has a 1 MHz continuous band. Assume the partitioning as done in step 220 above results in 100×10 KHz wide subchannels. The number in the subset of the plurality of subchannels assigned to each sector can be any subset of the 100. Assignment can be based on frequency planning to meet self-interference criteria. For example, assume a frequency re-use factor of 4, each sector can be allocated 25 subchannels. In some embodiments, each of subset of the plurality of subchannels allocated to a given sector (e.g., in the current example the 25 subchannels) are configured into subchannel groups of one or more subchannels so that, for example, all remotes in each sector can operate over only one subchannel or a portion of the subset of the plurality of subchannels (e.g., in the current example the 2-24 subchannels).

For a PtMP wireless communication system operating over a PLMR band, the subset of the plurality of subchannels assigned to each sector can correspond to one or more PLMR channels assigned to the sector. In some embodiments, for a PtMP wireless communication system operating over a PLMR band, the subset of the plurality of subchannels assigned to each sector can involve assigning frequency adjacent subchannels and/or subchannel groups.

In various embodiments, the subset of the plurality of subchannels and/or the subchannels groups assigned to a particular sector are all used by the base station. In various embodiments, the subset of the plurality of subchannels and/or the subchannels groups assigned to a particular sector are divided among the plurality of remote stations in a sector.

In some embodiments, the number subchannels that a particular remote station in a sector communicates over can depend on a path loss to the base station. In some embodiments, the number of subchannels that a particular remote station in a sector communicates over depends on a link budget aware scheduler that resides at the base station. In this manner, in a given sector the base station can dynamically allocate the number of subchannels that can be allocated to each remote station.

The method also involves creating a subchannel bit map for the plurality of subchannels (Step 240). The subchannel bit map can include all of the subchannels in the plurality of subchannels for the PtMP wireless communication system.

The method also involves for each sector, creating a populated subchannel bit map, wherein the populated subchannel bit map specifies an availability indicator which indicates for each subchannel if it is available in the particular sector, or not.

In some embodiments, the populated subchannel bit map indicates a subchannel is available in accordance with the subchannels assigned to the sector as described above in Step 230. For example, 100 plurality of subchannels is determined for PtMP wireless communication system. Also assume that a first sector is assigned subchannels 1 through 20 and a second sector is assigned 21 through 40 in Step 230 as described above. In this example, the populated subchannel bit map for the first sector includes 100 subchannels with an availability indicator for subchannels 1 through 20 as available and an availability indicator for subchannels 21 through 100 as not available, and the populated subchannel bit map for the second sector includes the same 100 subchannels with an availability indicator for subchannels 21 through 40 as available, and subchannels 1 through 20 and 41 through 100 as not available.

In some embodiments, if the availability indicator for a subchannel is not available this can indicate that the particular subchannel corresponds to a PLMR channel that is not available to the system or that particular subchannel is in use by another sector(s) which may create self-interference.

The populate subchannel bit map can be provided (e.g., transmitted, uploaded, retrieved from a file and/or programmed directly into) to a particular base station that belongs to the particular sector. In embodiments where the base station is a multisector base station, a populated subchannel bit map can be created for each sector that the multisector base station serves. In embodiments where there are multiple base stations in a sector (e.g., two base stations operating over different frequency ranges), a populated subchannel bit map can be determined for each.

The populated subchannel bit map can have values that are different for each sector. For example, assume two sectors (e.g., sector 30a and sector 30b as described above in FIG. 1), and assume 10 subchannels for the PtMP wireless communication system (e.g., system 100 as described above). If the subchannel bit map for sector 30a has subchannel 1 available, then the subchannel bit map for sector 30b can have the subchannel 1 as not available. On the other hand, if sectors 30a and 30b are separated by a long distance and are not likely to interfere with each other, they may be assigned the same subchannel.

In some embodiments, when the availability indicator for a particular subchannel is available, a second level checking of availability of the particular subchannel can be performed. For a PtMP wireless communication system operating over a PLMR band, when a subchannel is indicated as available, the subchannel can be further refined to always available or sometimes available. For example, PLMR channels available to the PtMP wireless communication system can be always available and can be referred to as a "white PLMR channels" or they can require coexistence with low utilization Push to Talk (PTT) voice transmitted by legacy PLMR systems owned by the same organization. The PTT voice can have priority over data. PLMR channels that can require coexistence with PTT can be referred to as "grey PLMR channels". For a base station that is assigned subchannels that correspond to grey PLMR channels, the base station can monitor PTT voice activity in the channel (e.g., by detecting the transmission of a squelch signal) and suspend data communication activity over the subchannel corresponding to the grey PLMR channel upon detection of voice activity. Data communication over the grey PLMR channel can resume when the voice activity stops.

The method also involves communicating by the base station of at least one sector of the plurality of sectors to at least one of the plurality of remote stations over the subchannels allocated to the at least one sector according to the respective populated subchannel bit map (Step 260).

In some embodiments Steps 210 through 250 are executed by a processor and the results are input to the base station. In some embodiments, the processor executing steps 210 through 250 resides inside of and/or communicates directly with the base station. In some embodiments, the subchannel bit map is provided to the base station and/or remote station as part of a configuration file.

As described above the base station for a given sector can be assigned a subset of the subchannels of all of the subchannels (the plurality of subchannels) available for the entire PtMP wireless communication system. The remote stations for a given sector can communicate over a single subchannel or multiple subchannels of the subset of subchannels that its respective base station communicates over.

The air interface protocol for communication between the base station and remote stations consists of a physical layer (PHY layer) and a Media Access Control (MAC) layer. These control/signal messages can include preambles, pilots, ranging signals, MAP and/or other signals as are known in the art. For example, assume a particular sector has 10 subchannels, and there is one remote station for each subchannel. In this example, the air interface signals are transmitted over the 10 subchannels.

As described above, the base station to remote station air interface protocol PHY layer (e.g., the downlink PHY layer) can be OFDM. The number of sub-carriers per subchannel can be one or more depending on the width of the subchannel. For example, for OFDM with 512 subcarriers, there can be 512 subchannels with one subcarrier used per subchannel. In this example, all of the subchannels are orthogonal to each other.

Frequency, sampling clock and TDD frame timing synchronization of the remote station to the base station can involve a preamble transmitted from the base station to the remote stations. The preamble can be generated from a pseudo-random sequence (e.g., a gold sequence) having a length of 127 using one of code from 1 to 63. As is known in the art, the downlink transmission can be done via frames (e.g., a Time Division Duplex (TDD) frame). The preamble can be transmitted periodically and/or can skip some frames. In frames that include the preamble, it can be placed in the first 127 symbols of the frame. The preamble can be transmitted in one of the subchannels of the subset of subchannels as determined for the particular sector. In frames that are missing the preamble data can be transmitted in place of the preamble. The periodicity of the preamble can be configurable (e.g., dynamically, input by a user, and/or read from a file).

In some embodiments, the base station to remote station communication can involve determining a minimum (or substantially minimum) resource allocation. The resource allocation can depend on a transport block, the transport block can consist of multiple bins. The bins can span over one subcarrier/tone across five symbols in time. The bin is the building block of a slot, where the slot is a minimum resource allocation needed for channel estimate. A slot is formed with two contiguous bins over the same subcarrier. In various embodiments, the minimum number of bins needed to form the minimum bytes is based on a modulation and coding schemes. For example, Table 1 is an example of minimum number of bins to form the minimum bytes for various modulation and coding schemes:

TABLE 1

| Modulation | FEC Rate | Bins | Bytes |
| --- | --- | --- | --- |
| QPSK | 1/3 | 3 | 1 |
| QPSK | 1/2 | 2 | 1 |
| QPSK | 3/4 | 4 | 3 |
| 16QAM | 1/2 | 1 | 1 |
| 16QAM | 3/4 | 2 | 3 |
| 64QAM | 3/4 | 4 | 9 |
| 64QAM | 5/6 | 2 | 5 |
| 256QAM | 5/6 | 3 | 8 |

As can be seen in Table 1, for a modulation of QPSK with an FEC rate of 1/3, the minimum number of bins needed to allocate 1 byte is 3. Additional allocations can be determined based on the minimum. For example, if 24 bytes are to be allocated, then for QPSK with a FEC rate of 1/3 with a minimum of 3 bins per byte, 72 bins can be used, whereas for 16QAM with a FEC rate of 1/2, and 1 bin per byte, 24 bins can be used.

Figure 4:
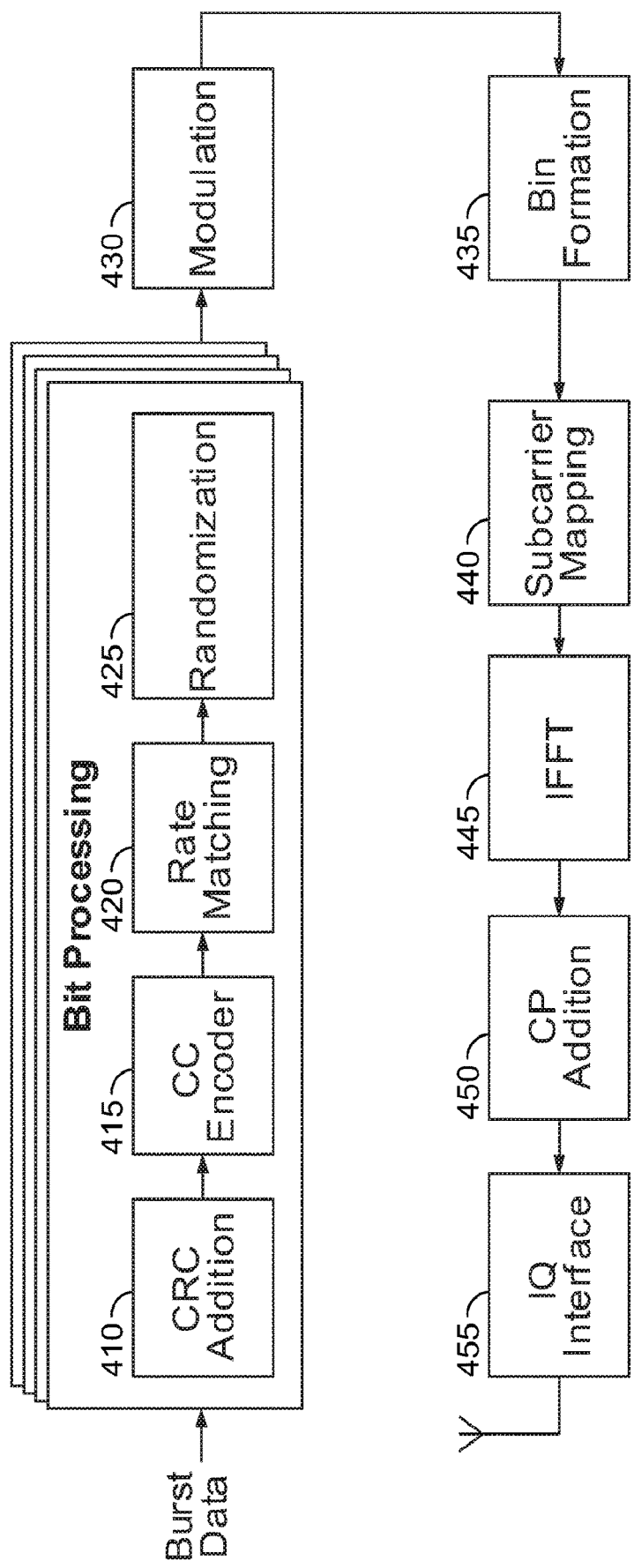
FIG. 4 is a functional block diagram showing a method for downlink transmission (DL-TX) for transmission from a base station to a remote station, according to some embodiments of the invention.

FIG. 4 is a functional block diagram showing a method for downlink transmission (DL-TX) for transmission from a base station (e.g., base station 16a as described above in FIG. 1) to a remote station (e.g., remote station 20a as described above in FIG. 1), according to some embodiments of the invention. The method can be implemented by a processor in the base station or partially by a processor in the base station and a remote processor (e.g., a base station controller).

The data (e.g., burst data) to be transmitted by the base station can be input to a cyclic redundancy check (CRC) addition module 410. The CRC additional module 410 can detect errors in the transmission of the data. For example, the CRD addition module 410 can be used to detect if the data was corrupted during transmission. The CRC addition module 410 can employ a 24-bit CRC. If there is an error in the transmission of the data then the data can be fixed or discarded. If there is not an error in the transmission of the data then the data can be output to the Chanel Coding (CC) encoder 415.

The CC encoder 415 can receive the data from the CRC addition module 410 and encode the data in accordance with a CC encoding scheme to, for example, lower an error rate. A channel, CC scheme and coding rate can be based on a type of the data. Table 2 is an example of the channel, CC scheme and coding rate for two types of data according to some embodiments of the invention:

TABLE 2

|  | Channel | Coding scheme | Coding Mother rate |
| --- | --- | --- | --- |
| Data channels | DL Data | Convolutional encoder | 1/3 |
|  | UL Data | Turbo encoder | 1/3 |
| IoT Maps | DL Control | Convolutional encoder | 1/3 |

The rate matching module 420 can receive data output from the CC encoder. The rate matching module 420 can extract a set of bits (e.g., and exact set of bits) to be transmitted.

The randomization module 425 can receive data output from the rate matching module 420 and randomize the data (e.g., as stream of downlink packets). The data can be randomized by modulo-2 addition of the data with an output of a pseudo-random binary sequence (PRBS) generator. In some embodiments, the PRBS generator polynomial is $c(x)=x^{15}+x^{14}+1$, The randomization can minimize a possibility of transmission of an unmodulated carrier and/or ensure an adequate number of bit transmissions to support clock recovery.

The modulation module 430 can receive output from the randomization module 425 and modulate the data. The data modulation can involve mapping the bits of the data onto constellation points. The modulation module 430 can modulate the data in accordance with QPSK, 16-QAM, 64-QAM or 256-QAM modulation schemes. For data of pilot symbols, BPSK modulation can be used. The modulation scheme can depend on coding parameters of the data (e.g., as contained in a bandwidth allocation message). The modulation module 430 can output complex I/O samples.

The bin formation module 435 can receive the output from the modulation module 430. The bin formation module 435 can place the data and/or pilot signals in respective symbols in a bin. The subcarrier mapping module 440 can receive the output from the bin formation module 435 and map the bin into a respective subcarrier.

The Inverse Fast Fourier Transform (IFFT) module 445 can receive the output from the subcarrier mapping module 440 and generate time domain IQ data. The IFFT can be taken of each symbol. The CP addition module 450 receive the output from the IFFT module 445 and can add a cyclic prefix (CP) by, for example, adding "$N_{CP}$" samples of a symbol to the beginning of the symbol, where "$N_{CP}$" is the number of CP samples. In some embodiments, the number of CP samples can be $1/8^{th}$ of FFT length, or $1/4^{th}$ of FFT length. In some embodiments, the number of CP samples is configurable.

The IQ interface module 455 can receive the output of the CP addition module 450 and be used to transmit the data via an antenna.

The remote station to base station waveform can be OFDMA or Single Carrier FDMA (SC-FDMA). The SC-FDMA can involve multiplexing a periodic synchronization signal (e.g., a preamble), a channel frequency response exploration signal (e.g., a pilot), subchannel management messages and/or the data that is the communication.

Figure 5:
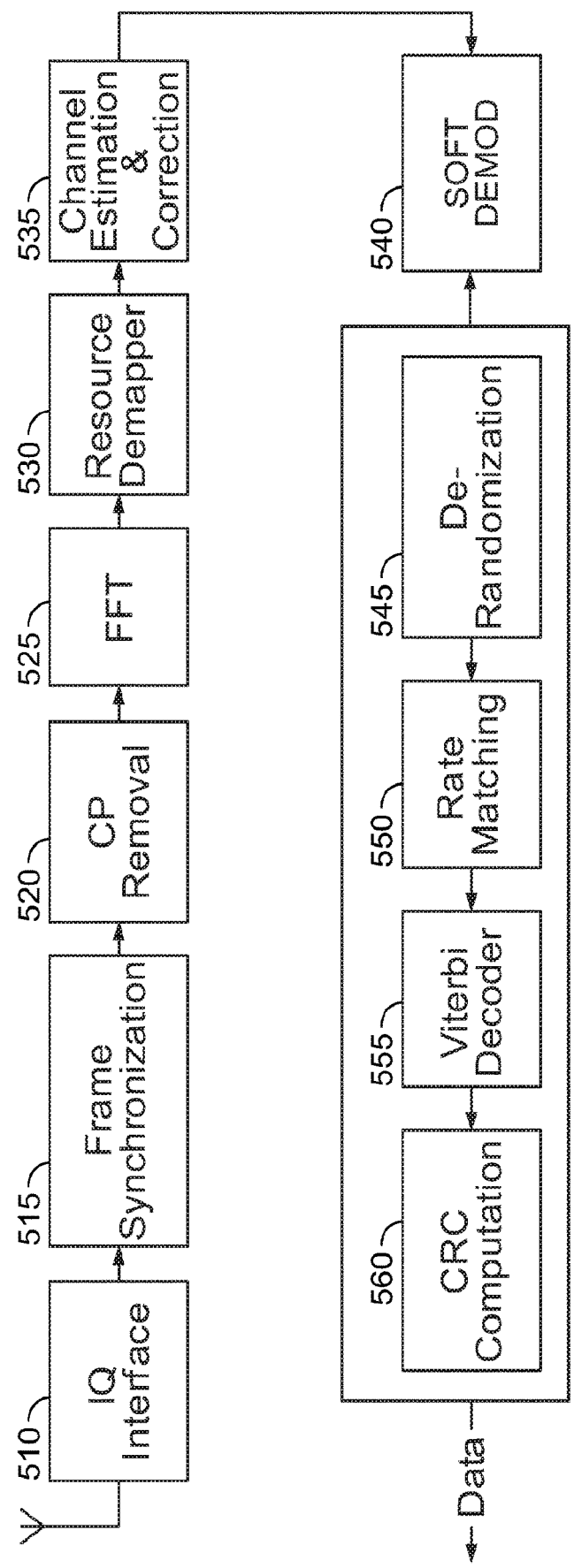
FIG. 5 is a functional block diagram showing a method for downlink receive (DL-RX) by a remote station from a base station, according to some embodiments of the invention.

FIG. 5 is a functional block diagram showing a method for downlink receive (DL-RX) by a remote station (e.g., remote station 20a, as described above in FIG. 1) from a base station (e.g., base station 30a as described above in FIG. 1), according to some embodiments of the invention.

The method involves receiving signals (e.g., samples) by the remote station at an IQ interface module 510. The frame synchronization module 515 synchronizes the data in time and/or frequency. The synchronization can be based on detecting the time and/or the frequency position of a preamble transmitted as part of the signals and detecting a downlink frame start based on the position of the preamble. A window can be opened to align the signals to the DL frame start.

The cyclic prefix (CP) removal module 520 can receive the output from the frame synchronization module 515 and remove CP samples. The Fast Fourier Transform (FFT) module 525 can receive the output from the CP removal module 520 and transform the samples into a frequency domain.

The resource de-mapper module 530 can receive the output from the CP removal module 520 and extract each user's data from the received data.

The channel estimation and correction module 535 can receive the output from resource demapper module 530 and can extract pilots from the received grid, find channel coefficients (e.g., using least square estimation), and perform linear interpolation on the channel coefficients to produce final channel coefficients. Channel equalization can be performed based on the final channel coefficients.

The soft demodulation module 540 can receive the output from the channel estimate and correction module 535 and demodulate such that a log-likelihood ratio (LLR) bit sequence is output. The LLR can be based on IQ samples. The demodulation can be QPSK or QAM-16 or QAM-64 or QAM-256 based on a modulation scheme used in the DL TX.

The de-randomization module 545 can receive the output from the soft demodulation module 540 and can arrange the output (e.g., which is randomized in the transmitter), to its original bit position. The rate matching module 555 can receive the output from the de-randomization module 545 and re-arrange the bits by, for example, splitting them into system bits and/or parity bits to produce and output at a mother rate. The Viterbi decoder module 555 can receive output from the rate matching module 555 and decode using channel coding techniques. The channel coding techniques can be convolutional code or turbo code. The CRC computation module 560 can receive the output from the Viterbi decoder module 555 and use CRC bits to detect errors.

In various embodiments, one or more downlink (DL) measurements can be made/determined. A DL Received Signal Strength Indicator (RSSI) can be determined at an antenna port of a remote station (e.g., a Mobile Station (MS)). The DL RSSI can be determined based on preamble signals. The DL RSSI can be averaged over time and/or reported to a base station, for example, upon a request of the base station. The DL RSSI can be determined in dBm units with 1 dB steps resolution. The DL RSSI in a liner domain can be computed as shown below in EQN. 1:

$$RSSI = \frac{1}{N}\sum_{k=0}^{N}(I_k^2 + Q_k^2) \quad \text{EQN. 1}$$

where N is a number of samples in the preamble, I is a real value of the preamble, Q is the imaginary value of the preamble. The DL RSSI as computed in EQN. 1 can be converted to dBm, where gain can be present from the antenna port of the remote station to an integrated low-power analog/digital converter (ADC) of the remote station, and/or the ADC gain can be compensated.

A DL Carrier to Interference+Noise Ratio (CINR) can be determined at the remote station. The DL CINR can be reported to the base station, for example, upon a request of the base station. The DL CINR can be reported in dB units with 1 dB resolution. The DL CINR can be determined as shown below in EQN. 2:

$$CINR = \frac{\sum_{n=1}^{N}|s(n)|^2}{\sum_{n=1}^{N}|r(n)-s(n)|^2} \quad \text{EQN. 2}$$

where r(n) is the received sample (e.g., data sample/pilot sample), s(n) is the corresponding detected data sample/pilot sample.

A DL interference indicating a minimum allocation called safety zone can be provided by the base station, such that interference present in each subchannel can be determined. During this determination the base station can refrain from transmitting. The base station and the remote station can compute interference level in dBm with 1 dB step using EQN. 1 as shown above. The DL interference and/or CINR measurements can be used to detect voice activity in the subchannels.

In some embodiments, a remote station to base station waveform (e.g., the uplink PHY layer) can be Single Carrier Frequency Division Multiple Access Scheme (SC-FDMA). SC-FDMA can support a single sub-carrier or multiple subcarriers and/or can be transmitted over multiple non-adjacent subchannels. The sub-carrier spacing (e.g., the subchannel bandwidth) in the uplink can be the same as the in the downlink.

Figure 6:
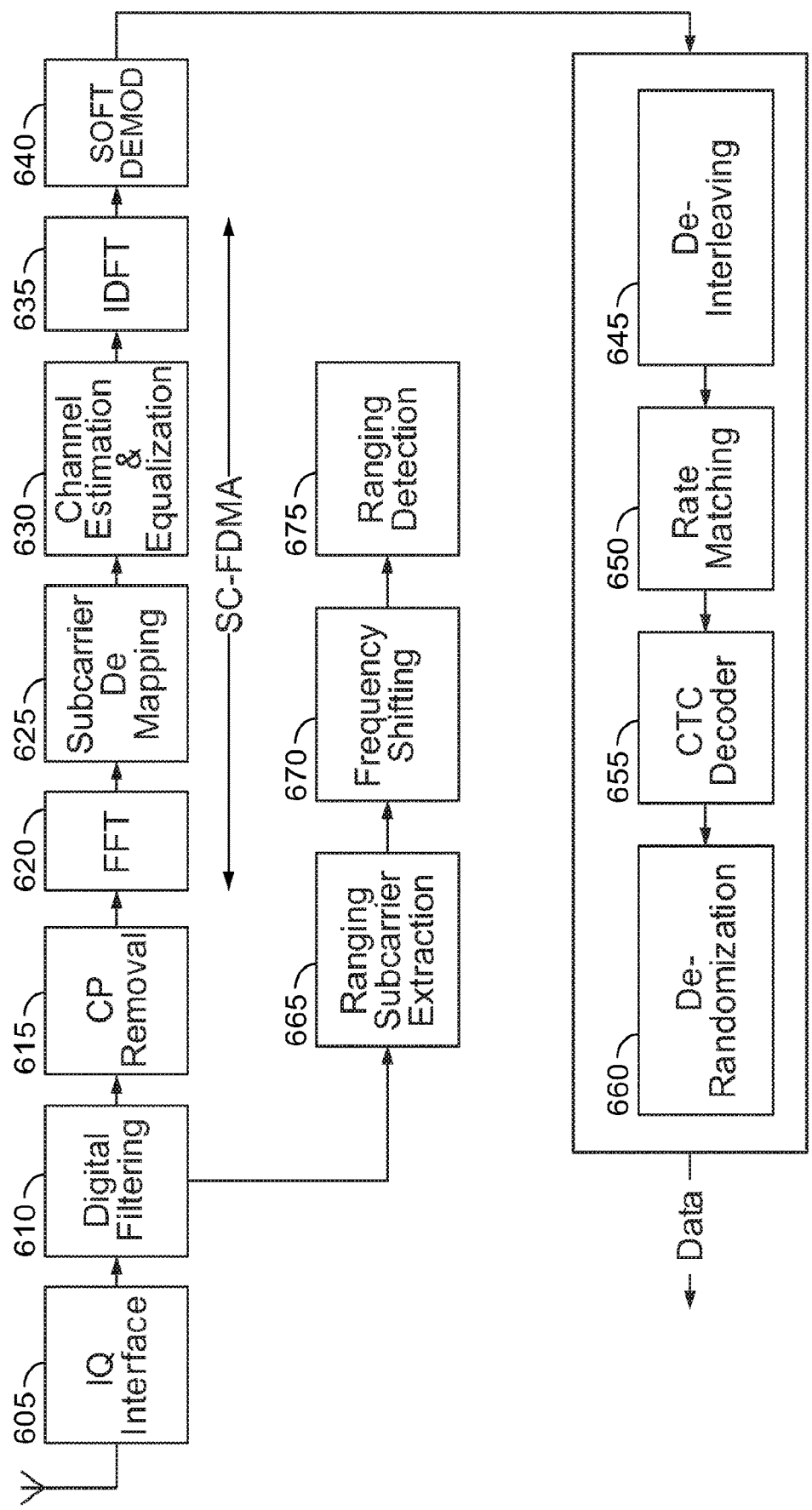
FIG. 6 is a functional block diagram showing a method for uplink receive (UL-RX) by a base station from a remote station, according to some embodiments of the invention.

FIG. 6 is a functional block diagram showing a method for uplink receive (UL-RX) by a base station (e.g., base station 16a as described above in FIG. 1) from a remote station (e.g., remote station 20a as described above in FIG. 1), according to some embodiments of the invention.

The base station can receive UL RF signals during UL time. The UL baseband receive processing can be divided into two branches, one of which is ranging decoding and the other is the remaining UL processing.

The method involves receiving signals (e.g., time domain samples) by the base station at an IQ interface module 605.

The digital filtering module 610 can receive the output of the IQ interface module 605. The digital filtering module 610 can attenuate unwanted in-band subchannels in the received signals. In some embodiments, the subchannels can be treated as in-band interference or if voice activity is detected at the base station, then the digital filtering module 610 can filter out the subchannels.

The CP removal module 615 can receive the output of the digital filtering module 610 and remove CP samples.

The CP removal module 615 can output to a process that can be referred to as the SC-FDMA modulation. The SC-FDMA modulation can include the FFT module 620, the subcarrier de-mapping module 625, the channel and estimate module 630 and the IDFT module 635.

The FFT module 620 can receive the output of the CP removal module 615 and perform an FFT. The subcarrier de-mapping module 625 can receive the output of the FFT module 620 and extract the user's data. The channel estimation and equalization module 630 can receive the output of the subcarrier de-mapping module 625 and can perform channel estimation and equalization as described above in FIG. 5. The IDFT module 635 can receive the output of the channel estimate and equalization module 635 and output a SC-FDMA demodulation output, which can be modulated symbols. The soft demodulation module 640 can receive the output of the IDFT module 635 and construct LLR from IQ samples. The demodulation performed by the soft demodulation module 640 can be QPSK or QAM16 or QAM64. The demodulation can produce a LLR bit sequence.

The de-interleaver module 645 can receive the output from the soft demodulation module 640 and produce a de-interleaved bit sequence order. The de-rate matching module 650 can receive the output from the de-interleaver module 645 and re-arrange the bits by, for example, splitting them into system bits and/or parity bits to produce and output at a mother rate. The turbo decoder (CTC) module 655 can receive output from the de-rate matching module 650 and decode using channel coding techniques. The CTC module 655 can decode based on system bits, parity bits and/or a number of repetitions to correct, if any, errors in received codewords. The output of the CTC module 655 can be randomized TBS (e.g., binary data).

The de-randomization module 660 can receive the output from the CTC module 655. The de-randomization module 660 can arrange randomized data in the transmitter to its original bit position. Output of the de-randomization module 660 can be TB data.

In some embodiments, ranging detection can be done by frequency domain processing, as shown by ranging subcarrier extraction module 665, frequency shifting module 670, and ranging detection module 675. In these embodiments, ranging codes from the remote station and/or a round trip delay (RTD) are being determined.

Figure 7:
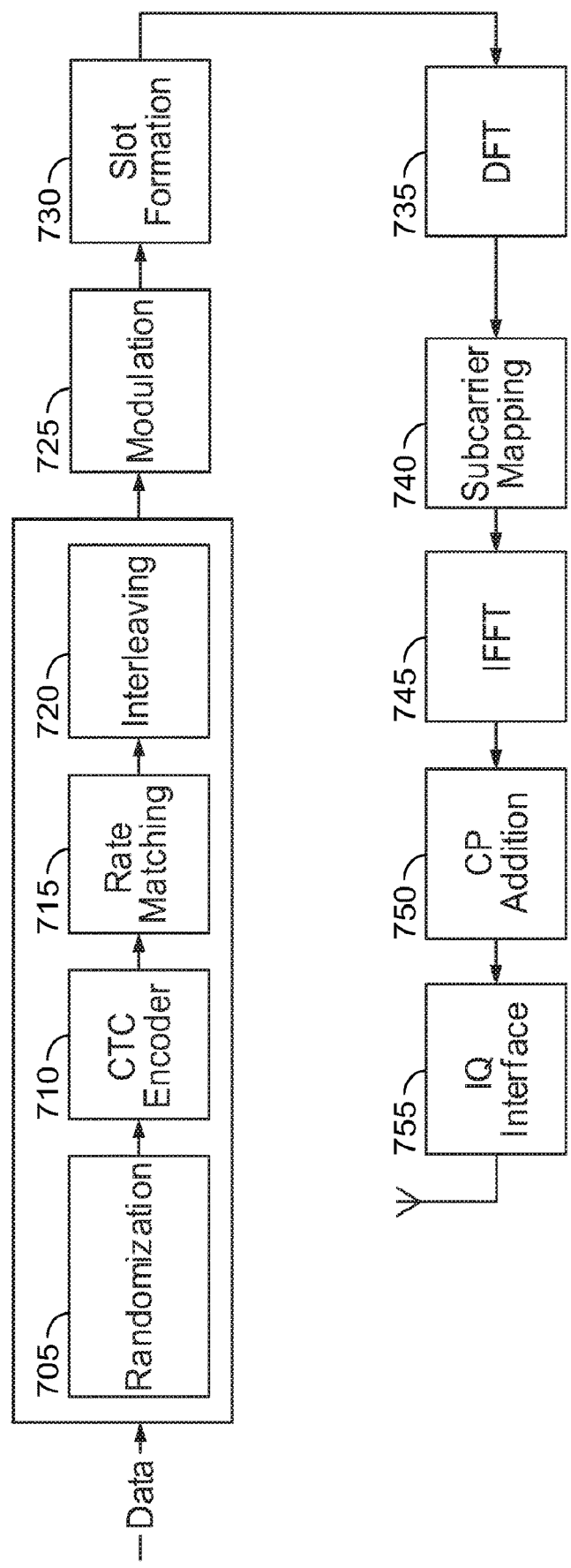
FIG. 7 is a functional block diagram showing a method for uplink transmit (UL-TX) by a remote station to a base station, according to some embodiments of the invention.

FIG. 7 is a functional block diagram showing a method for uplink transmit (UL-TX) by a remote station (e.g., remote station 20a as described above in FIG. 1) to a base station (e.g., base station 16a as described above in FIG. 1), according to some embodiments of the invention.

The randomization module 705 can randomize data to be transmitted. The randomization can minimize risk of transmission of unmodulated carriers to, for example, ensure an adequate number of bit transitions to support clock recovery.

The CTC encoder module 710 can receive the output of the randomization module 705, and perform channel coding. In some embodiments, turbo encoding with a 1/3 mother rate is used. The rate matching module 715 can receive the output of the CTC encoder module 710, and perform an extraction of the set of bits to be transmitted with the TBS. The interleaving module 720 can receive the output of the rate matching module 715, and perform interleaving. The interleaving can improve FEC in the event of a burst error.

The modulation module 725 can receive output from the interleaving module 720 and modulate the data. The data modulation can involve mapping the bits of the data onto constellation points. The modulation module 725 can modulate the data in accordance with QPSK, 16-QAM, 64-QAM or 256-QAM modulation schemes.

The slot formation module 730 can receive output from the modulation module 725 and place symbols in a respective bin/slot. The slot formation module 730 outputs to a process which can be referred to as the SC-FDMA modulation. The SC-FDMA modulation can involve the DFT module 735, subcarrier mapping module 740, the IFFT module 745, the CP addition module 750 and the IQ interface module 755. The SC-FDMA modulation can reduce PAPR and/or increase efficiency of the power amplifier of the remote station.

The DFT module 735 can receive the output from the slot formation module 730. The subcarrier mapping module 740 can receive output from the DFT module 735 to map to respective subcarriers. The IFFT module 745 can receive output from the DFT module 735, and perform IFFT to convert the data to the time domain. The CP addition module 750 can receive output from the IFFT module 745 and can add CP in the begging of the symbol. The IQ interface module 755 can receive output from the CP addition module 750 and transmit the data via the antenna.

In some embodiments, uplink time and power synchronization are performed via a ranging process. The ranging can involve a remote station transmitting a ranging code to the base station in a single subchannel. The base station can determine (e.g., detect and/or estimate) a round-trip delay (RTD) and/or a power correction. In some embodiments, a maximum RTD is 350 Km. In some embodiments, the ranging process is performed based on a frame's periodicity. In some embodiments, the ranging process is performed during UL data transmission. There can be two types of ranging processes, initial ranging and periodic ranging.

In some embodiments, sequence generation for initial ranging can involve allocating a generated zadoffchu sequence of length 127 with one of possible 1 to 126 root indices. The 127-length sequence can be placed in 254 symbols in one subcarrier by repeating each symbol twice. The repetition can be done such that for a first symbol it is placed with a cyclic prefix at a beginning symbol and for a second symbol placed with a cyclic suffix at and end of symbol and so forth, for example, as shown in Table 3 as follows:

TABLE 3

| CP | R(1) | R(1) | CS | CP | R(2) | R(2) | CS | CP | ... | CS | CP | R(127) | R(127) | CS |
| --- | --- | --- | --- | --- | --- | --- | --- | --- | --- | --- | --- | --- | --- | --- | where R(1) is the first value in the 127 length sequence, R(2) is the second value in the 127 length sequence, R(127) is the $127^{th}$ value in the 127 length sequence, CP is the cyclic prefix, and CS is the cyclic suffix.

In this manner the 127 length sequence can be mapped onto 254 symbols in time and a single subcarrier in frequency. The initial ranging process can reduce complexity of the initial ranging process.

In some embodiments, sequence generation for periodic ranging can involve generating a generated zadoffchu sequence of length 127 with one of possible 1 to 126 root indices. Time axis mapping can be done without repetition across symbols and with cyclic prefix places in the beginning of each symbol. The periodic ranging can be done at the request of the base station, at a predetermined interval, or both.

In various embodiments, the remote station has closed loop or open loop power control.

In some embodiments, the remote station has closed loop power control. The closed loop power control can involve determining a pathloss estimate. The pathloss estimate can be determined as shown below in EQN. 3:

$$\text{Pathloss} = \text{BS\_EIRP} - \text{RSSI} \quad \text{EQN. 3}$$

where BS_EIRP is the base station's equivalent isotropically radiated power (EIRP) and RSSI is receive signal strength indicator.

The closed loop power control can also involve setting transmit power at the remote station to be equal to or less than EIRP_IRMAX. The BS_EIRP and the EIRP_IRMAX can be transmitted over broadcast to the remote station and/or be pre-configured to the remote station. Based on an initial power setting the remote station can send a ranging signal to the base station. The base station can provide the remote station with a power correction. The power corrections can occur with the same periodicity as ranging.

In some embodiments, the remote station has open loop power control. The open loop power control can occur to adjust a remote station transmit power more frequently than the closed loop power control. For example, if the closed loop power control is not good enough. The remote station receive power can be adjusted based on a relative pathloss. The relative pathloss can be determined as shown below in EQN. 4:

$$\text{Relative\_Tx\_Power\_Adj} = \text{present\_Pathloss} - \text{previous\_Pathloss} \quad \text{EQN. 4}$$

where present_Pathloss is Pathloss as calculated in EQN. 3 above at the current time, previous1_Pathloss is Pathloss as calculated in EQN. 3 at a previous time. In some embodiments, if there is not closed loop power control, the base station can transmit the offset value for the open loop power control. The offset can be dependent upon the noise/interference as seen at the base station.

In some embodiments, the physical (PHY) layer has various control signals. The TDD frame synchronization, clock synchronization and/or frequency synchronization of the remote station to the base station can employ a preamble signal. This preamble signal can be multiplexed with data over the same subcarrier in the downlink direction. A ranging signal that can be used to determine a time advancement of the remote station relative to a start of the uplink subframe can be multiplexed over the same subcarrier as the data.

The control message communication (e.g., including synchronization and/or ranging) between the base station and the remote stations can employ the same bandwidth as the data communication. If the remote station operates over a single sub-channel, the control message communication can be limited to the use of a single subchannel. Phase continuity in OFDM subcarrier modulation can be employed to, for example, avoid un-authorized leakage into unused subchannels in a middle of the band.

In some embodiments, data transmission can be repeated up to 128 times to, for example, improve receive sensitivity. In some embodiments, the base station can determine a modulation and coding scheme based on CINR measurements and/or a link adaptation table configured at the base station. In some embodiments, there is repetition gain determined for link adaptation.

Figure 8:
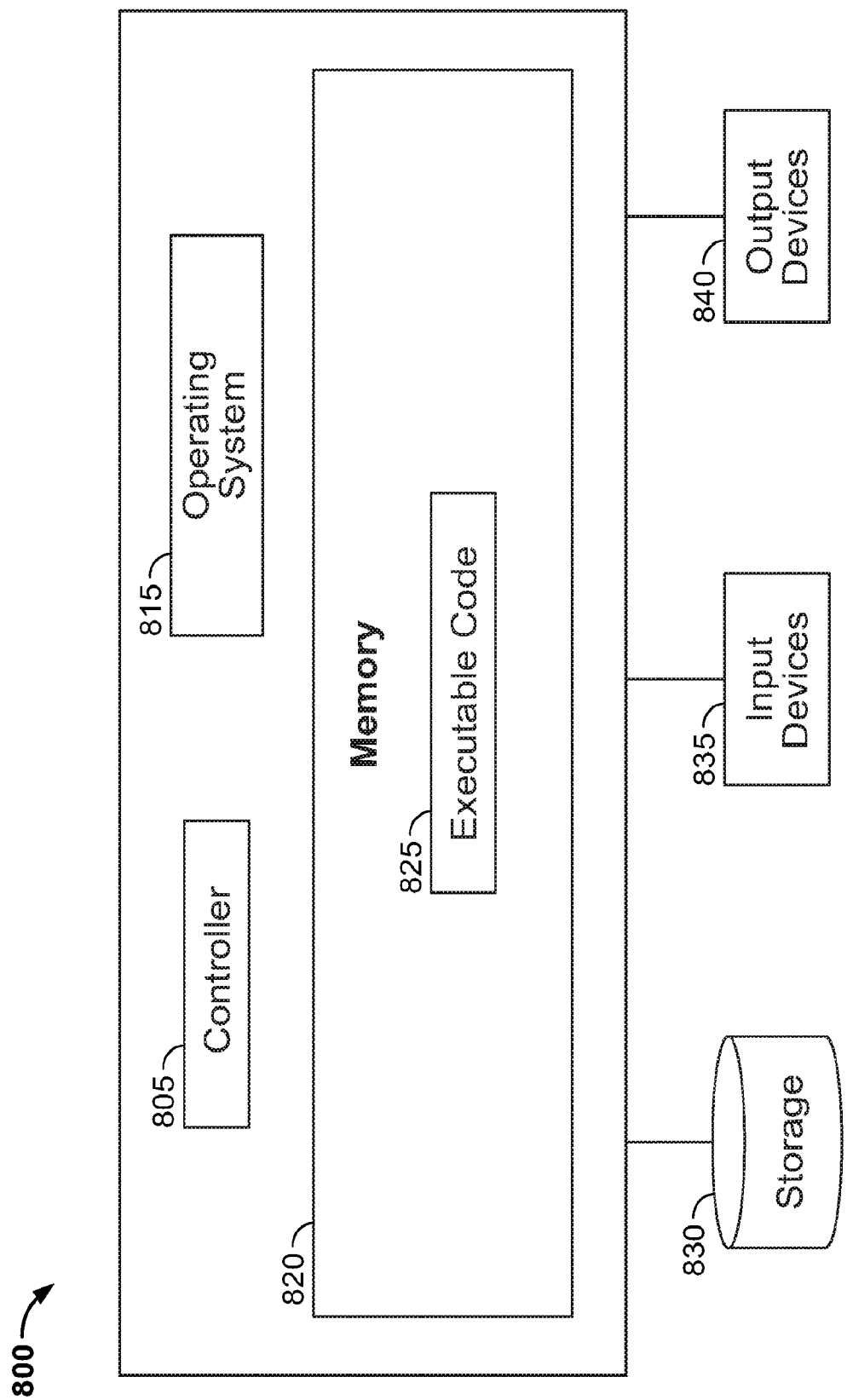
FIG. 8 is a high-level block diagram of an exemplary computing device which can be used with embodiments of the invention.

FIG. 8 is a high-level block diagram of an exemplary computing device which can be used with embodiments of the invention. Computing device 800 can include a controller or processor 105 that can be or include, for example, one or more central processing unit processor(s) (CPU), one or more Graphics Processing Unit(s) (GPU or GPGPU), a chip or any suitable computing or computational device, an operating system 815, a memory 820, a storage 830, input devices 835 and output devices 840. Each of modules and equipment such as processors, modules, boards, integrated circuits as referred to above, and other equipment mentioned herein can be or include a computing device, although various units among these entities can be combined into one computing device.

Operating system 815 can be or can include any code segment designed and/or configured to perform tasks involving coordination, scheduling, arbitration, supervising, controlling or otherwise managing operation of computing device 800, for example, scheduling execution of programs. Memory 820 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 820 can be or can include a plurality of, possibly different memory units. Memory 820 can store for example, instructions to carry out a method (e.g. code 825), and/or data such as user responses, interruptions, etc.

Executable code 825 can be any executable code, e.g., an application, a program, a process, task or script. Executable code 825 can be executed by controller 805 possibly under control of operating system 815. For example, executable code 825 can when executed cause the antenna's to emit radiation and/or receive radiation for processing according to embodiments of the invention. In some embodiments, more than one computing device 800 or components of device 800 can be used for multiple functions described herein. For the various modules and functions described herein, one or more computing devices 800 or components of computing device 800 can be used. Devices that include components similar or different to those included in computing device 800 can be used, and can be connected to a network and used as a system. One or more processor(s) 805 can be configured to carry out embodiments of the invention by for example executing software or code. Storage 830 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 830 and can be loaded from storage 830 into a memory 820 where it can be processed by controller 805. In some embodiments, some of the components shown in FIG. 2 can be omitted.

Input devices 835 can be or can include for example a mouse, a keyboard, a touch screen or pad or any suitable input device. It will be recognized that any suitable number of input devices can be operatively connected to computing device 800 as shown by block 835. Output devices 840 can include one or more displays, speakers and/or any other suitable output devices. It will be recognized that any suitable number of output devices can be operatively connected to computing device 800 as shown by block 840. Any applicable input/output (I/O) devices can be connected to computing device 800, for example, a wired or wireless network interface card (NIC), a modem, printer or facsimile machine, a universal serial bus (USB) device or external hard drive can be included in input devices 835 and/or output devices 840.

Embodiments of the invention can include one or more article(s) (e.g. memory 820 or storage 830) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures and/or components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for communication over a Point to Multipoint (PtMP) wireless communication system having a plurality of sectors, where each sector includes at least one base station and a plurality of remote stations, the method comprising:
    determining, by a processor, a total bandwidth for the PtMP wireless communication system, where the total bandwidth is:
        a) a frequency range of a continuous band allocated to the PtMP wireless communication system, or
        b) based on one or more PLMR channels when the PtMP wireless communication system communicates over a Private Land Mobile Radio (PLMR) band having one or more channels;
    partitioning, by the processor, the total bandwidth into a plurality of subchannels, wherein each subchannel has a fixed subchannel bandwidth;
    assigning, by the processor, each sector in the PtMP wireless system a subset of the plurality of subchannels;
    creating, by the processor, a subchannel bit map for the plurality of subchannels;
    for each sector, by the processor, creating a populated subchannel bit map, wherein the populated subchannel bit map specifies an availability indicator which indicates whether each subchannel is available or not available for the particular sector; and
    communicating by the base station of at least one sector of the plurality of sectors to at least one of the plurality of remote stations over the subchannels allocated to the at least one sector according to the respective populated subchannel bit map.

2. The method of claim 1 wherein determining the total bandwidth based on one or more PLMR channels further comprises setting a start value for the bandwidth equal to a lowest edge of the PMLR channel having the lowest frequency among the PLMR channels in the PLMR band and setting an end value equal to the highest edge of the PMLR channel having the highest frequency among the PLMR channels in the PLMR band.

3. The method of claim 1 wherein the fixed subchannel bandwidth is set such that the plurality of subchannels is an integer number of subchannels within the total bandwidth.

4. The method of claim 1 wherein the PtMP wireless communication system operates over a PLMR band having one or more PLMR channels, either:
    a) the fixed subchannel bandwidth is equal to a bandwidth of the one or more PLMR channels; or
    b) the fixed subchannel bandwidth is equal to a portion of the bandwidth of the one or more PLMR channels and is set such that the plurality of subchannels is an integer number of subchannels within the bandwidth of the one or more PLMR channels.

5. The method of claim 1 further comprising modifying the populated subchannel bit maps for one or more sector of the plurality of sectors during operation.

6. The method of claim 1 wherein if the availability indicator indicates a particular subchannel is available, then whether the particular subchannel is also used for voice communication is determined.

7. The method of claim 1 wherein the subchannel bit map for a first sector for a particular subchannel has an availability indicator that is different than the availability indicator for the same particular subchannel in the subchannel bit map for a second sector.

8. The method of claim 1 further comprising creating one or more subchannel groups that is a subset of the one or more plurality of channels, wherein the one or more subchannel groups include subchannels in the subset of the one or more plurality of channel that are adjacent in frequency.

9. The method of claim 1 wherein for each sector, each of the plurality of remote stations operates over a single subchannel or a subchannel group, wherein operating over the subchannel group comprises using one channel of the subchannel group for transmission of messages between the base station and the particular remote station that provide communication information, and the remaining channels in the subchannel group are used for communicating the data.

10. The method of claim 1 wherein the one or more PMLR channels are 5 KHz, 6.25 KHz, 7.5 KHz, 12.5 KHz, 15 KHz, 25 KHz, or 50 KHz.

11. The method of claim 1 wherein a waveform between the base station and the plurality of remote stations is air interface protocol.

12. The method of claim 1 wherein a waveform transmitted by the base station to the plurality of remote stations is OFDM with 512 subcarriers.

13. The method of claim 12 wherein a number of the plurality of subchannels is 512, and there is one subcarrier per subchannel.

14. The method of claim 12 wherein all subchannels are orthogonal to each other.

15. The method of claim 13 further comprising multiplexing a periodic synchronization message, a channel frequency response exploration message, a subchannel management message, and a data communication message on each subchannel.

16. The method of claim 1 wherein a waveform transmitted by the plurality of remote stations to the base station is OFDMA or Single Carrier FDMA.

17. A Point to Multipoint (PtMP) wireless communication system having a plurality of sectors, where each sector includes at least one base station and a plurality of remote stations, the system comprising:
   a processor configured to:
     determine a total bandwidth for the PtMP wireless communication system, where the total bandwidth is:
       c) a frequency range of a continuous band allocated to the PtMP wireless communication system, or
       d) based on one or more PLMR channels when the PtMP wireless communication system communicates over a Private Land Mobile Radio (PLMR) band having one or more channels;
     partition the total bandwidth into a plurality of subchannels, wherein each subchannel has a fixed subchannel bandwidth;
     assign each sector in the PtMP wireless system a subset of the plurality of subchannels;
     create a subchannel bit map for the plurality of subchannels;
     for each sector, create a populated subchannel bit map, wherein the populated subchannel bit map specifies an availability indicator which indicates whether each subchannel is available or not available for the particular sector; and
     communicate by the base station of at least one sector of the plurality of sectors to at least one of the plurality of remote stations over the subchannels allocated to the at least one sector according to the respective populated subchannel bit map.

* * * * *